United States Patent [19]

Jablonski

[11] Patent Number: 4,726,365

[45] Date of Patent: Feb. 23, 1988

[54] AIR FILTERING APPARATUS

[76] Inventor: Richard Jablonski, 112 Westbury Dr., Coraopolis, Pa. 15108

[21] Appl. No.: 861,300

[22] Filed: May 9, 1986

[51] Int. Cl.[4] .......................... A62B 7/00; B64D 13/00

[52] U.S. Cl. .......................... 128/202.13; 128/206.19; 244/118.5; 206/216; 206/438; 206/803

[58] Field of Search ...................... 128/205.27, 205.28, 128/205.29, 206.12, 206.14, 206.16, 206.18, 206.19, 206.25, 202.13, 202.16, 202.19, 201.24, 201.25; 206/438, 439, 446, 570, 803, 208, 210, 213, 849, 870, 495; 244/118.5

[56] References Cited

U.S. PATENT DOCUMENTS

| | | | |
|---|---|---|---|
| 3,834,384 | 9/1974 | Raines | 128/206.14 |
| 4,269,315 | 5/1981 | Boyce | 128/206.19 |
| 4,271,834 | 6/1981 | Tanaka | 128/206.19 |
| 4,297,117 | 10/1981 | Holter et al. | 128/206.19 |
| 4,382,440 | 5/1983 | Kapp et al. | 128/205.29 |
| 4,402,317 | 9/1983 | Martin | 128/205.29 |
| 4,523,588 | 6/1985 | Dolsky | 128/205.29 |

FOREIGN PATENT DOCUMENTS

| | | | |
|---|---|---|---|
| 1588942 | 4/1981 | United Kingdom | 128/206.19 |
| 2103491 | 2/1983 | United Kingdom | 128/206.19 |

*Primary Examiner*—Edward M. Coven
*Assistant Examiner*—Karin M. Reichle
*Attorney, Agent, or Firm*—Carothers & Carothers

[57] ABSTRACT

An aircraft emergency apparatus including a disposable air filtration mask for short term breathing in normally disabling breathing conditions, and the combination of such an air filtration mask with other aircraft emergency apparatus to enhance accessability and use thereof by aircraft occupants.

13 Claims, 3 Drawing Figures

AIR FILTERING APPARATUS

BACKGROUND OF THE INVENTION

In the art of air filtration it is well known to provide an expanse of air filtering medium that is formed into a disposable full-face filtration mask which covers the nose and mouth of a user to thereby filter the breathing air which reaches the user's lungs. Such a mask typically includes an elastic band or similar fastner to secure the mask to the user's face, as well as rigid support elements which are secured to the mask to cooperate with portions of the user's face (e.g., the bridge of the nose) for support of the mask on the user's face. Such masks typically have been utilized for filtration of particulate matter such as dust entrained in the ambient air.

Other known filtration masks include a permanent mask (as opposed to the above characterized disposable type) with canisters that hold replaceable filtration elements. These masks ordinarily are supplied with filtration elements according to the specific type of material to be filtered from the breathing air. For example activated charcoal filter elements will be utilized in such canister type masks to filter certain chemical pollutants from the breathing air, or a filter element saturated with a suitable chemically effective substance may be utilized to chemically absorb or neutralize pollutants in the ambient breathing air.

Such prior art filtration masks as above described have been recognized primarily for use in overcoming the harmful effects of long term exposure to dust or vapor pollutants in the ambient air which might be encountered in any number of industrial or other workplace environments. As such, the prior art of such filtration masks has not contemplated uses where other significant parameters of the air filtration equipment such as minimal use of storage space, ease of quick emergency deployment and use, and minimal equipment weight would be significant factors.

In the commercial airline industry, such parameters become extremely important as unnecessary weight and bulk of equipment carried on an aircraft directly impact on the aircraft payload and therefore the profitability of each flight. In addition, emergency circumstances in commercial aircraft travel may dictate that individual travelers having no experience in emergency procedures nevertheless be able to quickly deploy and use emergency equipment to facilitate their escape, or rescue of them from an aircraft. For example, in recent test crashes as well as in at least one real aircraft fire, it was found that a great many serious injuries or passenger deaths in an aircraft fire result not from burns but inhalation of smoke and toxic gases generated by combustion of materials inside the aircraft. The limited space in an aircraft cabin, and the relatively large number of passengers typically occupying it are two factors which can greatly aggravate the danger to passengers in an aircraft fire. The confines space of the aircraft cabin will fill with smoke and toxic gases very quickly if even a small fire starts. The resultant difficulty in breathing and blinding effect of the smoke can dangerously increase the sense of panic in the aircraft cabin and/or quickly disable the occupants, and thereby reduce or completely eliminate any possibility of an effective rescue operation.

In the prior art there has not been known any completely satisfactory means or providing aircraft passengers with a mode of short term emergency breathing assistance to allow them time to escape the debilitating smoke and toxic gases of an aircrtaft cabin fire.

BRIEF SUMMARY OF THE INVENTION

The present invention contemplates a novel air filtration mask and a mask in combination with known conspicuous emergency apparatus in standard use on commercial aircraft to provide aircraft passengers with readily available air filtration systems which may be conveniently deployed and used for short term breathing assistance to limit the effects of smoke and toxic gases for a sufficient period to permit escape from the cabin. The result anticipated will be significantly reduced fatalities and serious injuries in emergency aircraft fire situations where escape from the cabin is possible.

The invention contemplates a disposable full face mask formed of filtration medium and including an elastic headstrap or other fastener for securing the mask to the face of a user. The mask preferably is permeated with a chemically effective filtration agent such as activated charcoal particles and/or a suitable liquid solution for absoprtion of neutralization of toxins in the ambient breathing air. The mask preferably includes structure to permit it to be folded flat and retained in the folded configuration for packaging thereof in a sealed pouch wherein the chemical agent is isolated from the atmosphere and thereby maintained fresh and effective. Preferably the mask is sealed in a pouch which is affixed to an air sickness bag, an emergency flight instruction card, or other suitable item of emergency apparatus that is typically found in the seat pocket in front of each passenger seat on the aircraft. The filtration mask pouch preferably is of a rip-open construction with a conspicuous pull tab for easy and quick deployment of the filtration mask upon need therefor.

The filtration mask is both small in size and light in weight, and because it may be folded flat it occupies little space or weight capacity of the aircraft. Its air filtration capabilities are of course limited, but nevertheless are sufficient for the purpose of limited duration, extreme need situations such as aircraft fire rescue operations.

It is therefore one object of the present invention to provide a novel and improved breathing air filtration apparatus.

A further object of the invention is to provide a disposable and lightweight air filtration mask for short term protection from breathing of high density particulates and toxins generated by combustion.

Still another object of the invention is to provide a combined lightweight disposable combination of aircraft emergency apparatus including a single use, disposable air filtration mask.

These and other objects and further advantages of the invention will be more readily appreciated upon consideration of the following detailed description and the accompanying drawings, in which.

Figure 1:
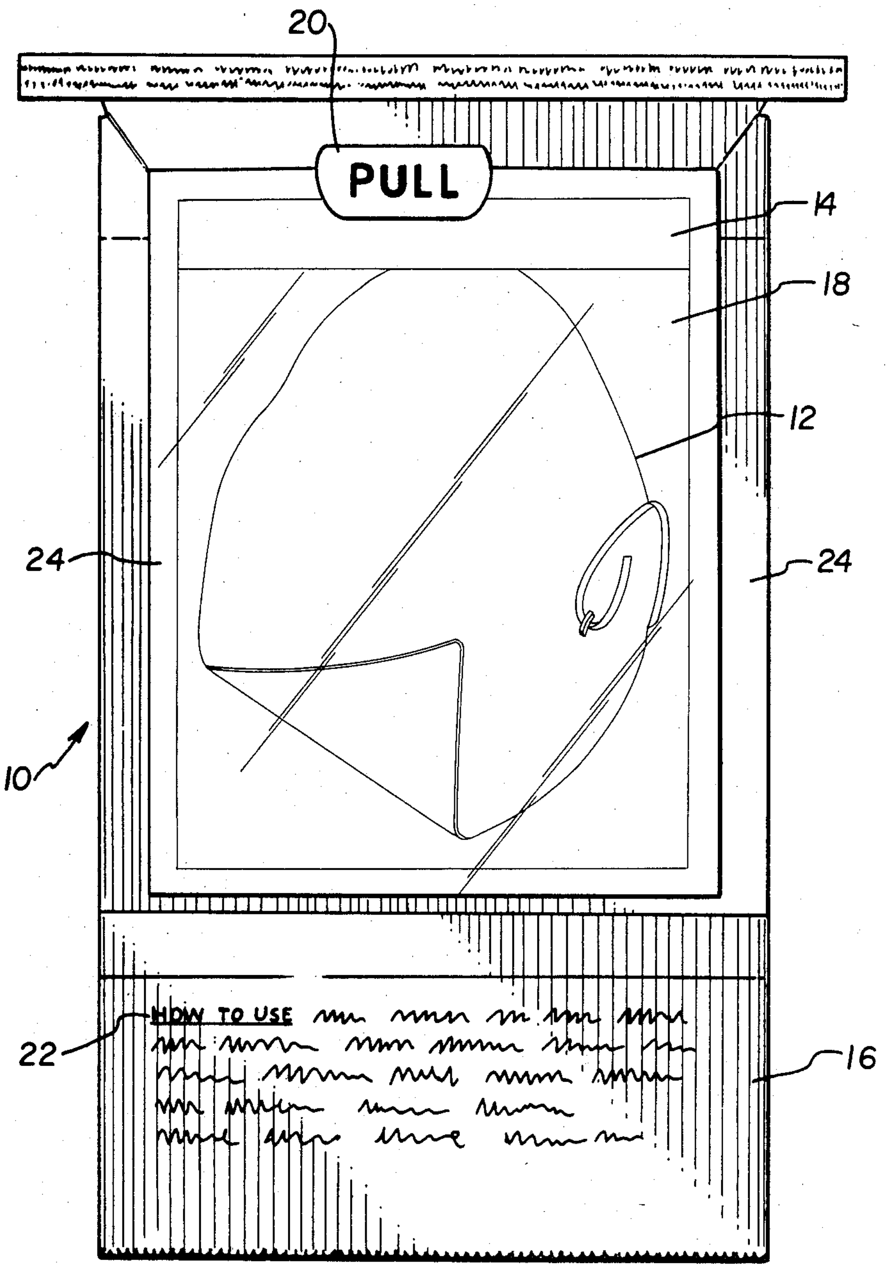
FIG. 1 is a frontal elevation of an apparatus according to aspects of the instant invention with an air filtration mask shown packages in its folded configuration.
Figure 2:
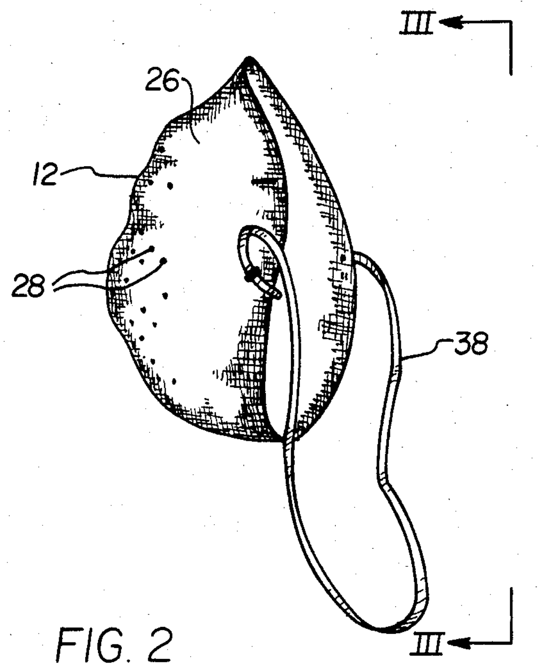
FIG. 2 is a side elevation of an air filtration mask of the present invention shown unfolded for use.
Figure 3:
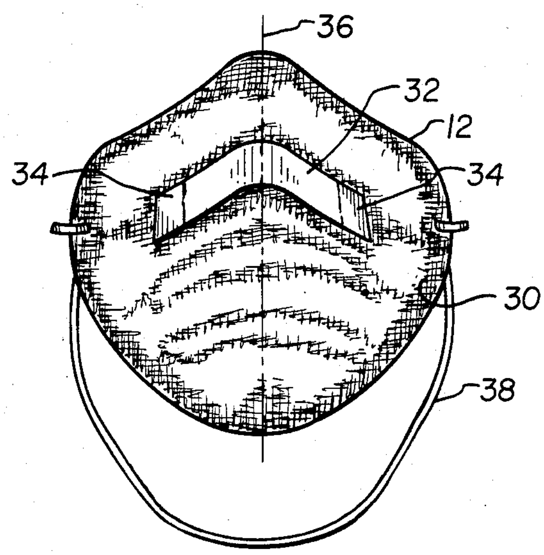
FIG. 3 is a rear elevational view taken from line III—III of FIG. 2.

There is generally indicated at 10 in FIG. 1 an emergency breathing air filtration apparatus according to one presently preferred embodiment of the instant invention and comprising as shown a disposable breathing air filtration mask 12 that is folded flat and packaged within a rip-open thin-section pouch 14 that is affixed to one side of a standard piece of aircraft safety apparatus normally disposed in the pocket before each passenger seat, for example an air sickness bag 16. In lieu of the bag 16, such emergency apparatus might be, for example, a card explaining aircraft emergency procedures, or other similar aircraft safety or emergency item.

Pouch 16 preferably includes a transparent or semi-transparent front panel 18 through which the mask 12 is clearly visible, and a conspicuously labeled pull tab 20 which, when properly pulled by a passenger, will fully open the pouch 14 for easy access to mask 12. Specifically, upon pulling tab 20 in accordance with instructions provided, for example as at 22 on the bottom of the bag 12 or alternatively on a lower portion of pouch 14, the pouch may open by tearing along side seams 24 thereof or alternatively along a central tear strip running the length of the pouch 14. The mask 12 is thereby quickly and easily accessible in an emergency situation to passengers in need thereof. Of course it is to be understood that the procedures for use of air sickness bag 16 is completely conventional and is unimpaired by the presence of pouch 14 thereon and the mask 12 within pouch 14.

Mask 12 preferably is of a single use, disposable type preferably comprising a formed expanse of fibrous filtration medium 26 which is shaped to form a full face filtering mask that covers both the nose and mouth of a user and forms a perimeter seal thereabout to filter the breathing air delivered to the user. The filtering medium 26 preferably is impregnated with a sufficient density of chemically active filtering substance such as activated charcoal 28 or other suitable medium for absorption of potentially toxic vapors passing the filtering medium 26. For example, in addition to activated charcoal 28, filtering medium 26 may also preferably be saturated with a suitable absorbing or neutralizing solution for chemical absorption or neutralizing of toxic vapors passing through the filtration medium 26, and for enhanced particulate arresting ability. For this reason, pouch 14 is sealed fluid tight to insure that the solution saturating the mask 12, as well as the activated charcoal will not lose its filtering capability during storage. The mask 12, once packaged in pouch 14 would therefore have virtually unlimited shelf life as regards the chemically effective filtering capability thereof.

The nature of the saturating solution used would of course depend entirely upon the type of vapors to be absorbed or neutralized thereby, but in all cases the solution should also be of a nature to prevent, or the mask packaged in a way to prevent, deterioration over time due to mildew and the like. Accordingly, the saturating solution would preferably constitute a hostile environment for spores, mold and bacteria, or alternatively the saturated mask 12 would be sterilized after packaging thereof within pouch 14 to prevent growth of mold, mildew and bacteria colonies therein.

Commonly disposable air filtration masks are intended for use over a comparatively long term (e.g. at least several hours) for particulate filtering only. According to the present invention, a mask of the disposable type with only very limited ability for capturing and/or neutralizing toxic vapors as well as particulates nevertheless finds tremendous utility in an environment such as emergency rescue from an aircraft fire wherein even extremely short term enhancement of survivability prospects through improved protection from smoke and toxic vapors will result in enormous improvements in the success of the rescue efforts.

Prior disposable masks often have included a transverse rigid support extending laterally of the mask across the area which coincides with the bridge of the nose to help support the mask on the face of the user and to maintain the shape of the mask. According to the present invention, the mask is folded flat for storage and therefore any such rigid support element would interfere with folding and unfolding of the mask. Accordingly, in place of such a rigid support, the mask 12, which is formed as a mouth and nose receiving pocket, is provided on the interior or concave side 30 thereof with an adhesive strip 32 having non-adhesive end portions 34. The mask of the present invention therefore relies upon adhesive strip 32 rather than on any rigid support element to help maintain the form or shape of the mask for use and to maintain the position of the mask on a user's face. Specifically, when folded, mask 12 generally is collapsed along a vertical centerline 36 thereof to lie flat within pouch 14 as shown in FIG. 1. In this configuration, the portions of adhesive strip 32 on opposite sides of centerline 36 are adhered together to help maintain the mask 12 in its folded or stowed configuration. For use of the mask when deployed from pouch 14 as above described, the mask is pulled open by grasping same at the opposite sides of strip 32 at or near the end portions 34. This pulls apart the adhered opposite sides of adhesive strip 32. The non-adhesive end portions 34 permit ease of opening of mask 12 and application thereof to the face, and prevent tearing of the strip 32 from the inside of mask 12 during opening thereof as described.

In use, the mask is placed over the face of a user to encompass the nose and mouth with elastic headband 38 passing around the head of the user and strip 32 passing over the bridge of the user's nose. The headband 38, together with adhesion of strip 32 to the bridge of the nose and adjacent areas of the user's face, serves to maintain the mask in its operative orientation on the user's face and in sealed engagement therewith to filter the breathing air taken in by the user.

As above mentioned, all that is intended or necessary for proper functioning of mask 12 is ease of use and application, together with short term effective filtering of particulates and toxins resulting from fire which could otherwise completely disable an aircraft passenger very quickly and thereby hamper rescue efforts. A charcoal permeated mask such as this preferably would be designed to filter most unidentified toxins out of the breathing air. In addition, water or chemical saturation of the mask would provide maximum filtration of particulates such as smoke and in addition acid gases such as hydrogen choloride, hydrogen fluoride and hydrogen cyanide. The above are by no means to be considered exhaustive of the particulates and toxins which such a mask could effectively filter on a short term basis.

According to the description hereinabove the present invention provides a novel and improved disposable air filtration apparatus incorporating capability for effective short term filtration of high levels of harmful particulates and/or toxins from breathing air, which apparatus may be conveniently utilized in environments where equipment weight and bulk must be minimized and where enhanced short term survivability of emergency conditions is of critical importance. Of course, I have contemplated various alternative and modified embodiments of the invention which would also occur to others skilled in the art, once apprised of the invention disclosed herein. Accordingly, it is intended that the invention be construed broadly and limited only by the scope of the claims appended hereto.

I claim:

1. An apparatus for emergency use by an occupant of an aircraft in an emergency situation comprising:

a first flat emergency appartus;

a flat sealed pouch affixed to said first emergency apparatus to form in combination therewith a thin section unitary structure adapted to be carried in a seatback pocket of an aircraft;

a disposable air filtering face mask folded into a flat non-use configuration and disposed in said pouch; and said pouch including means for opening thereof to permit access to said mask for use of said mask by such an occupant independent of said first emergency apparatus.

2. The apparatus as claimed in claim 1 additionally including instructions for use of said disposable face mask.

3. The apparatus as claimed in claim 1 wherein said means for opening is means for destructive opening of said pouch.

4. The apparatus as claimed in claim 3 wherein said means for destructive opening includes pull tab means and at least one tear strip portion of said pouch which is effective upon pulling of said pull tab means for form an access opening into said pouch adjacent said at least one tear strip portion.

5. The apparatus as claimed in claim 1 wherein said disposable face mask comprises a formed expanse of particulate filtering media impregnated with a chemically effective filtration means to arrest toxic vapors from air which passes through said filtering media.

6. The apparatus as claimed in claim 5 wherein said filtration means includes particles of activated charcoal embedded in said particulate filtering media.

7. The apparatus as claimed in claim 6 wherein said filtration means further includes a liquid state filtration substance which saturates said particulate filtration media.

8. The apparatus as claimed in claim 7 wherein said formed expanse of particulate filtering media is flexibly formable from said non-use configuration to an unfolded use configuration which defines a generally concave pocket of a form to overlie the nose and mouth of such a user.

9. The apparatus as claimed in claim 8 wherein said pocket includes a pressure sensitive adhesive means which traverses the portion of said pocket coincident with the bridge of a user's nose to adhesively engage same for maintaining said face mask in place on such a user's face.

10. The apparatus as claimed in claim 9 wherein, when said mask is folded into said flat non-use configuration, adjacent portions of said adhesive means are disposed in confronting engagement and adhered to one another to maintain said mask in said non-use configuration.

11. The apparatus as claimed in claim 9 additionally inlcuding headband means attached to opposite sides of said pocket and engageable about the head of such a user to maintain said face mask in place on such a user's face.

12. The apparatus as claimed in claim 11 wherein said liquid state filtration substance is water.

13. The apparatus as claimed in claim 11 wherein said liquid state filtration substance is a chemically active toxin absorbing neutralizing substance.

* * * * *